Dec. 26, 1950   C. R. LORENZ   2,535,584
FISHING REEL
Filed Aug. 30, 1949
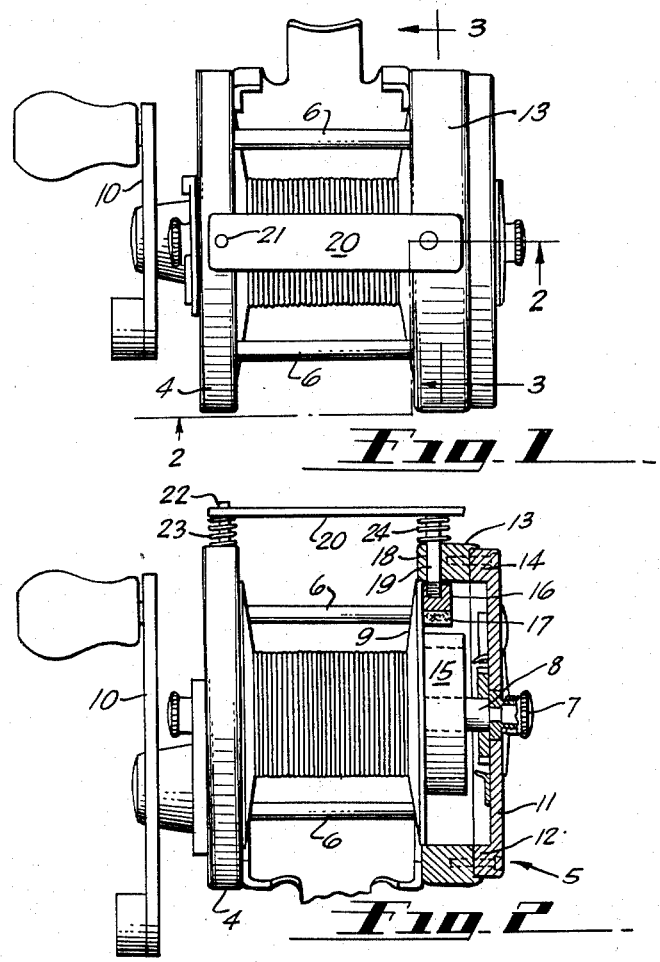
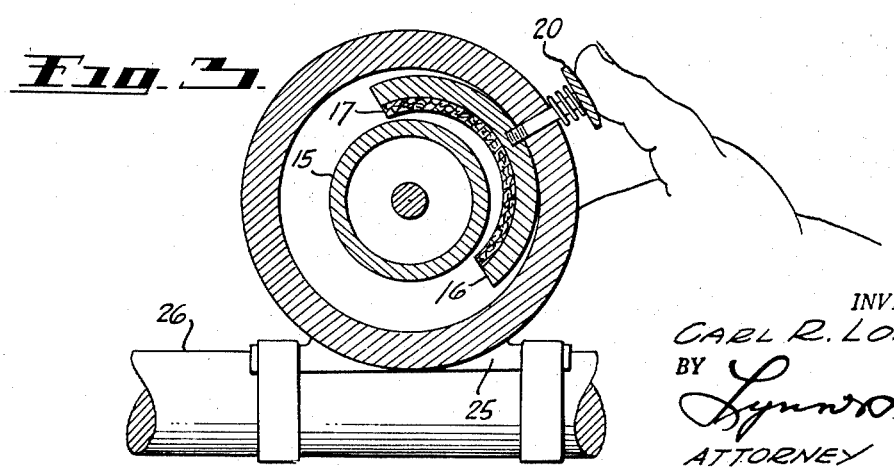
INVENTOR.
CARL R. LORENZ
BY Lynn Latta
ATTORNEY Patented Dec. 26, 1950

2,535,584

UNITED STATES PATENT OFFICE 2,535,584

FISHING REEL

Carl R. Lorenz, Santa Monica, Calif.

Application August 30, 1949, Serial No. 113,208

2 Claims. (Cl. 242—84.5)

This invention relates to fishing reels. It has as its general object to provide a fishing reel incorporating manually operable braking means for use in retarding the unwinding of a fish line from the reel under the pull of a fish that has been caught. While I am aware that there have been prior proposals for incorporating braking mechanism in a fishing reel, such prior devices have not been fully satisfactory, in that they have utilized operating buttons which require that the operator's thumb or finger be in one particular position in order to operate the braking mechanism. My invention contemplates the use of an operating bar extending transversely the full width of the reel, through which braking pressure may be applied from the operator's thumb in any position between the two sides of the reel. Thus it becomes possible for the hand to assume a natural position in holding the rod. Although the operating bar extends the full width of the reel, the pressure is utilized at only one side of the reel, and is applied through a push rod extending through the casing at that side of the reel. To maintain the operating bar in a position parallel to the reel axis, the other end of the bar is slidably mounted upon a guide post fixed in the other side of the reel.

With the foregoing in mind, the invention has as its object to provide a relatively simple and inexpensive braking mechanism incorporating an operator member extending the full width of the reel and having means on which the operating member is mounted for radial movement toward the axis of the reel for applying braking pressure, while being held firmly in a transverse position parallel to the reel axis.

Other objects will become apparent in the ensuing specifications and appended drawings in which:

Fig. 1 is a plan view of a reel embodying my invention;

Fig. 2 is a sectional view thereof taken on the line 2—2 of Fig. 1; and

Fig. 3 is a sectional view thereof taken on the line 3—3 of Fig. 1.

As an example of one form in which the invention may be embodied, I have shown in the drawings a reel embodying casing members 4 and 5 connected in spaced relationship by posts 6 and having journals 7 in which is mounted, for rotation, the shaft 8 of a reel spool 9. The casing member 4 provides a housing for conventional gearing (not shown) through which rotation is transmitted from the handle 10 to the reel spool 9.

The casing member 5 embodies a conventional side disc 11 having an annular flange 12, and also includes an annular extension flange 13 secured to the flange 12 as by means of screws 14. It will be understood that in production, the flange members 12 and 13 may be formed integrally as a single flange. The portion 13 of the flange provides additional depth in the housing 5 to accommodate the braking mechanism which will now be described. Secured to a flange of reel spool 9 is a brake drum 15. An arcuate brake shoe 16 having a brake lining 17 of leather, fibre, or equivalent material, is positioned within the brake housing defined between the casing member 5 and the adjacent flange of spool 9. The inner surface of lining 17 is shaped to conform to the peripheral surface of brake drum 15. Slidably mounted in a cylindrical bore 18 in flange member 13 is a push rod 19 the inner end of which is threaded into or otherwise secured to brake shoe 16. The outer end of push rod 19 is rigidly secured to one end of operator bar 20, the other end of which has an opening 21 slidably receiving a guide pin 22 that is mounted in casing member 4. Encircling push rod 19 and guide pin 22 and interposed between operator bar 20 and casing members 4 and 5 respectively are a pair of coil springs 23 and 24 which yieldingly maintain the operator bar in an outwardly projected position in which brake shoe 16 is out of contact with brake drum 15.

The reel is provided with a conventional yoke member 25 by means of which the reel may be attached to a fishing rod 26. The yoke 25 is so positioned with reference to operator bar 20 that when it is attached to the rod 26, with handle 10 on the right hand side of the rod looking toward the tip thereof, operator bar 20 will be disposed adjacent the handle of rod 26, with its push rod 19 inclined at an angle of approximately 45 degrees to the axis of the rod, whereby the operator may hold the rod handle in either hand, and, with the thumb of that hand, reach up and engage the operator bar 20. By pressing against the bar 20 at any point along its length, push rod 19 will be moved radially inwardly, pressing brake shoe 16, 17 against brake drum 15. When pressure is released, springs 23, 24 will return the braking apparatus to its inoperative outwardly projected position.

I claim:

1. In a fishing reel, in combination with a pair of casing members and a reel spool rotatably mounted therebetween, one of said casing members having a peripheral flange and an end wall cooperating with said spool to define a brake housing, a brake drum attached to the adjacent end of said reel spool and disposed within said housing, an arcuate brake shoe engageable with said brake drum, a push rod to the inner end of which said brake shoe is secured, a bearing bore in said flange in which said push rod is mounted for radially sliding movement, an operator bar rigidly attached to the outer end of said push rod, compressible means engaged between said flange and said bar and yieldingly maintaining said bar and brake shoe in outwardly projected positions with said brake shoe out of contact with said brake drum, a guide pin mounted in the other casing member, said bar having at its other end an opening slidably receiving said guide pin, and compressible means yieldingly engaged between said other end of the bar and said other casing to maintain said bar in a position extending transversely between said casing members while allowing radial movement of the bar.

2. In a fishing reel, in combination with a pair of casing members and a reel spool rotatably mounted therebetween, one of said casing members having a peripheral flange and an end wall cooperating with said spool to define a brake housing, a brake drum attached to the adjacent end of said reel spool and disposed within said housing, an arcuate brake shoe engageable with said brake drum, a push rod to the inner end of which said brake shoe is secured, a bearing bore in said flange in which said push rod is mounted for radially sliding movement, an operator bar rigidly attached to the outer end of said push rod, compressible means engaged between said flange and said bar and yieldingly maintaining said bar and brake shoe in outwardly projected positions with said brake shoe out of contact with said brake drum, a guide pin mounted in the other casing member, said bar having at its other end an opening slidably receiving said guide pin, and a coil spring encircling said guide pin and engaged under compression between said other end of the bar and said other casing for assisting said first mentioned coil spring in projecting said bar outwardly to maintain said bar in a position extending transversely between said casing members while allowing radial movement of the bar.

CARL R. LORENZ.

REFERENCES CITED

The following references are of record in the file of this patent:

UNITED STATES PATENTS

| Number | Name | Date |
|---|---|---|
| 2,237,991 | Howe | Apr. 8, 1941 |

FOREIGN PATENTS

| Number | Country | Date |
|---|---|---|
| 14,987 | Great Britain | July 20, 1899 |